US011345800B2

(12) United States Patent
Chang et al.

(10) Patent No.: US 11,345,800 B2
(45) Date of Patent: May 31, 2022

(54) HIGH TEMPERATURE TIE LAYER COMPOSITIONS, AND ARTICLES MADE THEREFROM (71) Applicant: Dow Global Technologies LLC, Midland, MI (US)

(72) Inventors: Dane Chang, Sugar Land, TX (US); Condell Doyle, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/047,782

(22) PCT Filed: Apr. 18, 2019

(86) PCT No.: PCT/US2019/028025
§ 371 (c)(1),
(2) Date: Oct. 15, 2020

(87) PCT Pub. No.: WO2019/204549
PCT Pub. Date: Oct. 24, 2019

(65) Prior Publication Data
US 2021/0155784 A1    May 27, 2021

Related U.S. Application Data (60) Provisional application No. 62/660,293, filed on Apr. 20, 2018.

(51) Int. Cl.
*B32B 1/08* (2006.01)
*B32B 27/08* (2006.01)
(Continued)

(52) U.S. Cl.
CPC ............ *C08L 23/0815* (2013.01); *B32B 1/08* (2013.01); *B32B 27/08* (2013.01); *B32B 27/12* (2013.01);
(Continued)

(58) Field of Classification Search
CPC .............. C08L 23/04; C08L 2205/035; C08L 2205/03; C09J 123/0815
(Continued)

(56) References Cited

U.S. PATENT DOCUMENTS 5,643,997 A * 7/1997 Matsuoka ............... C08L 23/06
525/71
8,575,275 B2    11/2013 Henschke et al.
(Continued)

FOREIGN PATENT DOCUMENTS

EP          0479457         4/1992
EP          0495996         7/1992
(Continued)

OTHER PUBLICATIONS

PCT/US2019/028025, International Search Report and Written Opinion dated Jul. 22, 2019.
(Continued)

*Primary Examiner* — Lee E Sanderson (57) ABSTRACT

A tie layer composition comprising from 60 wt. to 95 wt. % of a first polyethylene composition comprising a first molecular weight ethylene-based polymer component and a second molecular weight ethylene-based polymer component, wherein the polyethylene resin has a density from 0.940 to 0.960 g/cc and a melt index (I2) from 0.01 to 5 g/10 min; and from 5 wt. % to 40 wt. % of a second polyethylene composition comprising: (i) a high density polyethylene having a density greater than or equal to 0.940 g/cc; and (ii) a maleic-anhydride grafted polyethylene.

11 Claims, 3 Drawing Sheets

(51) Int. Cl.
 *B32B 27/12* (2006.01)
 *B32B 27/32* (2006.01)
 *C08L 23/08* (2006.01)

(52) U.S. Cl.
 CPC .......... *B32B 27/32* (2013.01); *B32B 2250/03* (2013.01); *B32B 2262/101* (2013.01); *B32B 2307/718* (2013.01); *B32B 2307/72* (2013.01); *B32B 2597/00* (2013.01); *C08L 2203/16* (2013.01); *C08L 2203/18* (2013.01); *C08L 2205/035* (2013.01); *C08L 2207/062* (2013.01)

(58) Field of Classification Search
 USPC .............. 428/36.1, 36.91; 525/191, 240, 242
 See application file for complete search history.

(56) References Cited

U.S. PATENT DOCUMENTS

| | | | | |
|---|---|---|---|---|
| 2003/0175538 | A1* | 9/2003 | Yamaguchi | C09J 123/0815 428/515 |
| 2004/0097637 | A1* | 5/2004 | Botros | C09J 123/06 524/504 |
| 2010/0098935 | A1* | 4/2010 | McGee | C09J 7/35 428/319.3 |
| 2010/0108173 | A1* | 5/2010 | Hayes | B32B 27/20 138/143 |
| 2010/0304051 | A1* | 12/2010 | Henschke | C08L 23/06 428/17 |
| 2015/0111034 | A1* | 4/2015 | Botros | C08L 23/0815 428/355 EN |
| 2015/0210903 | A1 | 7/2015 | Kim et al. | |
| 2016/0040044 | A1* | 2/2016 | Lee | C08L 23/0815 428/355 EN |

FOREIGN PATENT DOCUMENTS

| | | |
|---|---|---|
| EP | 0784089 | 7/1997 |
| EP | 1298168 | 4/2003 |
| WO | 2013184187 | 12/2013 |
| WO | 2016022581 | 2/2016 |
| WO | 2017/039953 | 3/2017 |
| WO | 2017210423 | 12/2017 |

OTHER PUBLICATIONS

PCT/US2019/028025, International Preliminary Report on Patentability dated Oct. 20, 2020.

\* cited by examiner

HIGH TEMPERATURE TIE LAYER COMPOSITIONS, AND ARTICLES MADE THEREFROM

FIELD

Embodiments of the present disclosure generally relate to high temperature tie layer compositions and applications of the high temperature tie layer compositions to make shaped articles, such as, for example, pipes.

BACKGROUND

The use of non-metallic materials in piping for the transport of oilfield fluids, onshore and offshore, is expanding. Multilayer pipes manufactured from polyolefins, for example, HDPE resins, are relatively light in weight, easy to handle, less expensive and are non-corrosive. Conventional polyolefin multilayer pipes can provide a relatively high rigidity, allowing them to withstand high external loads, and a relatively high flexibility so that they can also adapt to internal loads. However, conventional pipes used to transport oilfield fluids withstand moderate temperatures and pressures. Use of conventional pipes in high temperature applications, where the pipes transport high temperature materials, can cause pipes to have premature mechanical failures. In certain piping applications, such as, oilfield fluid transport applications, the use of pipes that can withstand high temperature and pressure applications, such as, above 140° F. at pressures above 300 psi, as well as have good processability in manufacturing pipe is desirable.

Accordingly, high temperature tie layer compositions, and shaped articles comprising high temperature tie layer compositions having good thermal properties, as well as good processability, may be desired.

SUMMARY

Disclosed in embodiments herein are tie layer compositions. The tie layer compositions comprise: from 60 wt. to 95 wt. % of a first polyethylene composition comprising a first molecular weight ethylene-based polymer component and a second molecular weight ethylene-based polymer component, wherein the polyethylene resin has a density from 0.940 to 0.960 g/cc and a melt index (I2) from 0.01 to 5 g/10 min; and from 5 wt. % to 40 wt. % of a second polyethylene composition comprising: from 1 to 99 wt. %, based on the total weight of the composition, of a high density polyethylene having a density greater than or equal to 0.940 g/cc; and from 1 to 99 wt. %, based on the total weight of the composition, of a maleic-anhydride grafted polyethylene.

Also disclosed herein are multilayer pipes. The multilayer pipes comprise a first layer, a second layer, and a third layer, wherein the second layer is positioned between the first layer and third layer, and wherein the second layer is formed from a tie layer composition. The tie layer composition comprises from 60 wt. to 95 wt. % of a first polyethylene composition comprising a first molecular weight ethylene-based polymer component and a second molecular weight ethylene-based polymer component, wherein the polyethylene resin has a density from 0.940 to 0.960 g/cc and a melt index (I2) from 0.01 to 5 g/10 min; and from 5 wt. % to 40 wt. % of a second polyethylene composition comprising: from 1 to 99 wt. %, based on the total weight of the composition, of a high density polyethylene having a density greater than or equal to 0.940 g/cc; and from 1 to 99 wt. %, based on the total weight of the composition, of a maleic-anhydride grafted polyethylene.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of tie layer compositions. The tie layer compositions described herein are suitable for use in geomembranes, pipes or tubing, pipe coatings, pipe liners, pipe fittings, and environmental pond liners applications. It is noted, however, that this is merely an illustrative implementation of the embodiments disclosed herein. The embodiments are applicable to other technologies that are susceptible to similar problems as those discussed above. For example, the compositions described herein may be used in drip irrigation tape and tubing, films, sheets, tapes, fibers, caps and closures, and molded articles by molding processes, including blow molding, compression molding, and injection molding (for example, the injection molding of pipe fittings), all of which are within the purview of the present embodiments.

The tie layer compositions are polyethylene-based. "Polyethylene-based" is used herein to refer a tie layer composition having a majority weight percent of the polymers present in the tie layer composition being polyethylene. "Polyethylene" includes ethylene homopolymers as well as a copolymers of ethylene and one or more comonomers, where ethylene is the majority component of the copolymer. In some embodiments, the tie layer composition comprises greater than or equal to 90 wt. %, 95 wt. %, 97 wt. % 98.5 wt. % 99 wt. % or 99.5 wt. % of one or more polyethylene resins, based on the total polymers present in the tie layer composition.

The tie layer composition comprises from 60 wt. % to 95 wt. % of a first polyethylene composition and from 5 wt. % to 40 wt. % of a second polyethylene composition. All individual values and subranges of from 60 wt. % to 95 wt. % of a first polyethylene composition and from 5 wt. % to 40 wt. % of a second polyethylene composition are included and disclosed herein. For example, in some embodiments, the tie layer composition comprises from 65 wt. % to 95 wt.

%, from 70 wt. % to 95 wt. %, from 75 wt. % to 95 wt. %, or from 80 wt. % to 95 wt. % of a first polyethylene composition and from 5 wt. % to 35 wt. %, from 5 wt. % to 30 wt. %, from 5 wt. % to 25 wt. %, or from 5 wt. % to 20 wt. % of a second polyethylene composition First Polyethylene Composition The first polyethylene composition comprises a first molecular weight ethylene-based polymer component and a second molecular weight ethylene-based polymer component. As used herein, "ethylene-based polymer" refers to a polymer that comprises, in polymerized form, a majority weight percent ethylene (based on the weight of polymer), and, optionally, one or more additional comonomers. The first polyethylene composition may comprise a combination of two or more embodiments as described herein.

In embodiments herein, the first molecular weight ethylene-based polymer component of the polyethylene resin may be an ethylene-based interpolymer, ethylene/α-olefin interpolymer, homogeneously branched ethylene-based interpolymer or copolymer, or a heterogeneously branched ethylene-based interpolymer or copolymer. Homogeneously branched interpolymers may be produced, for example, by single-site catalyst systems, and contain a substantially homogeneous distribution of comonomer among the molecules of the interpolymer. Heterogeneously branched interpolymers may typically be produced by Ziegler-Natta type catalysts, and contain a non-homogeneous distribution of comonomer among the molecules of the interpolymer. The comonomer may be an α-olefin. In some embodiments, the first molecular weight ethylene-based polymer component is an ethylene/α-olefin interpolymer, and further an ethylene/α-olefin copolymer. In other embodiments, the first molecular weight ethylene-based polymer component is an ethylene/1-hexene copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. As used herein, the term "ethylene-based interpolymer" refers to an interpolymer that comprises, in polymerized form, a majority weight percent ethylene (based on the weight of interpolymer), and one or more additional comonomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers.

Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, and 1-octene. In further embodiments, α-olefins are selected from the group consisting of 1-hexene and 1-octene. In even further embodiments, the α-olefin is 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EH and EO copolymers. In further embodiments, the ethylene/α-olefin interpolymer is EH.

In embodiments herein, the first polyethylene composition has a density greater than, or equal to, 0.940 g/cc, greater than, or equal to, 0.945 g/cc, or greater than, or equal to, 0.948 g/cc and has a density less than, or equal to, 0.960 g/cc, or less than, or equal to, 0.955 g/cc. All individual values and subranges of greater than, or equal to, 0.940 g/cc and less than, or equal to, 0.960 g/cc, are included and disclosed herein. For example, in some embodiments, the first polyethylene composition has a density of 0.940 to 0.960 g/cc, 0.945 to 0.960 g/cc, 0.945 to 0.955 g/cc, or 0.945 to 0.950 g/cc.

In embodiments herein, the first polyethylene composition has a melt index (I2) of 0.01 to 5 g/10 min. All individual values and subranges of 0.01 to 5 g/10 min, are included and disclosed herein. For example, in some embodiments, the first polyethylene composition has a melt index (I2) from 0.01 to 4 g/10 min, from 0.02 to 4 g/10 min, from 0.02 to 2 g/10 min, from 0.04 to 1.0 g/10 min, or 0.04 to less than 1.0 g/10 min.

In embodiments herein, the first polyethylene composition has a high load melt index (I21) of from 1 to 20 g/10 min. All individual values and subranges of 1 to 20 g/10 min, are included and disclosed herein. For example, in some embodiments, the first polyethylene composition has a high load melt index (I21) of from 1 to 15 g/10 min, 1 to 12 g/10 min, 2 to 12 g/10 min, or 3 to 10 g/10 min.

In embodiments herein, the first polyethylene composition has a MWD of 10 to 40, as determined by conventional GPC. All individual values and subranges of 10 to 40 are included and disclosed herein. For example, in some embodiments, the first polyethylene composition may have a MWD of 12 to 30 or 15 to 25. As used herein, MWD refers to the ratio of weight average molecular weight (Mw) to number average molecular weight (Mn), that is, (Mw/Mn). The MWD may be determined by conventional gel permeation chromatography (GPC), as described herein.

In embodiments herein, the density of the first molecular weight ethylene-based polymer component is from 0.910 to 0.940 g/cc. All individual values and subranges of 0.910 to 0.940 g/cc are included and disclosed herein. For example, in some embodiments, the density of the first molecular weight ethylene-based polymer component is from 0.915 to 0.940 g/cc. In other embodiments, the density of the first molecular weight ethylene-based polymer component is from 0.920 to 0.940 g/cc. In further embodiments, the density of the first molecular weight ethylene-based polymer component is from 0.920 to 0.935 g/cc. Densities disclosed herein for ethylene-based polymers are determined according to ASTM D-792.

In embodiments herein, the first molecular weight ethylene-based polymer component differs from the second molecular weight ethylene-based polymer component in one or more properties, such as, for example, high load melt index ($I_{21}$), density, number average molecular weight (Mn), weight average molecular weight (Mw), and/or MWD. In some embodiments, the first molecular weight ethylene-based polymer component may have a significantly higher weight average molecular weight than the second molecular weight ethylene-based polymer component. The difference in the weight average molecular weights is reflected in the melt indices. Accordingly, in some embodiments, the high load melt index, $I_{21}$ (190° C., 21.6 kg weight) of the first molecular weight ethylene-based polymer component is 0.05 to 1.2 g/10 min. All individual values and subranges of 0.05 to 1.2 g/10 min are included and disclosed herein. For example, in some embodiments, the high load melt index, $I_{21}$ of the first molecular weight ethylene-based polymer component is 0.10 to 1.0 g/10 min. In other embodiments, the high load melt index, $I_{21}$ of the first molecular weight ethylene-based polymer component is 0.10 to 0.80 g/10 min. In further embodiments, the high load melt index, $I_{21}$ of the first molecular weight ethylene-based polymer component is 0.20 to 0.60 g/10 min.

In embodiments herein, the second molecular weight ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an α-olefin as described herein. In some embodiments, the second molecular weight ethylene-based polymer component is an ethylene-based interpolymer. In other embodiments, the second molecular weight ethylene-based polymer component is ethylene/1-hexene copolymer. In other embodiments, the second molecular weight ethylene-based polymer component is a polyethylene homopolymer. In further embodiments, the second molecular weight ethylene-based polymer component is a mixture of a polyethylene homopolymer and an ethylene/α-olefin interpolymer.

The second molecular weight ethylene-based polymer component may have a weight average molecular weight (Mw) of less than 50,000 g/mole. All individual values and subranges of less than 50,000 g/mole are included and disclosed herein. For example, in some embodiments, the second molecular weight ethylene-based polymer component may have a weight average molecular weight (Mw) of less than or equal to 40,000 g/mole, less than or equal to 30,000 g/mole, or less than or equal to 20,000 g/mole. In other embodiments, the second molecular weight ethylene-based polymer component may have a weight average molecular weight (Mw) of greater than or equal to 1,000 g/mole, greater than or equal to 2,000 g/mole, or greater than or equal to 3,000 g/mole. In further embodiments, the second molecular weight ethylene-based polymer component may have a weight average molecular weight (Mw) of greater than 1,000 g/mole to less than or equal to 30,000 g/mole. In even further embodiments, the second molecular weight ethylene-based polymer component may have a weight average molecular weight (Mw) of greater than 1,000 g/mole to less than or equal to 20,000 g/mole.

In embodiments herein, the density of the second molecular weight ethylene-based polymer component is from 0.950 to 0.990 g/cc. All individual values and subranges of 0.950 to 0.990 g/cc are included and disclosed herein. For example, in some embodiments, the density of the second molecular weight ethylene-based polymer component is from 0.955 to 0.985 g/cc. In other embodiments, the density of the second molecular weight ethylene-based polymer component is from 0.960 to 0.980 g/cc. In further embodiments, the density of the second molecular weight ethylene-based polymer component is from 0.965 to 0.978 g/cc. The density of the second molecular weight ethylene-based polymer component may be determined from the following equation:

$$\frac{1}{\text{Density}(PE)} = \frac{\text{Weight Fraction}(A)}{\text{Density}(A)} + \frac{\text{Weight Fraction}(B)}{\text{Density}(B)} \qquad (I)$$

wherein "A" is the first molecular weight ethylene-based polymer component, "B" is the second molecular weight ethylene-based polymer component, and "PE" is the first polyethylene composition.

The first polyethylene composition may comprise any amount of the first molecular weight ethylene-based polymer component or the second molecular weight ethylene-based polymer component. In some embodiments, either component can be present, independently, in amounts of 0.5% to 99.5%, by weight of the first polyethylene composition. All individual values and subranges of 0.5% to 99.5% are included and disclosed herein. For example, in some embodiments, the first polyethylene composition comprises 30% to 70%, by weight of the first polyethylene composition, 35% to 65%, by weight of the first polyethylene composition, or 40% to 60%, by weight of the first polyethylene composition, of the first molecular weight ethylene-based polymer component. In other embodiments, the first polyethylene composition comprises 30% to 70%, by weight of the first polyethylene composition, 35% to 65%, by weight of the first polyethylene composition, or 40% to 60%, by weight of the first polyethylene composition, of the second molecular weight ethylene-based polymer component. In further embodiments, the weight ratio of the first molecular weight ethylene-based polymer component to the second molecular weight ethylene-based polymer is from 0.4 to 2.3. In even further embodiments, the weight ratio of the first molecular weight ethylene-based polymer component to the second molecular weight ethylene-based polymer is from 0.6 to 2.0. In even further embodiments, the weight ratio of the first molecular weight ethylene-based polymer component to the second molecular weight ethylene-based polymer is from 0.8 to 1.5.

In embodiments herein, the first polyethylene composition may comprise an Mw of the first molecular weight ethylene-based polymer component that is greater than the Mw of the second molecular weight ethylene-based polymer component. In some embodiments, the Mw of the first molecular weight ethylene-based polymer component is at least twice the Mw of the second molecular weight ethylene-based polymer component. In other embodiments, the Mw of the first molecular weight ethylene-based polymer component is at least ten times the Mw of the second molecular weight ethylene-based polymer component. In further embodiments, the Mw of the first molecular weight ethylene-based polymer component is at least twenty times the Mw of the second molecular weight ethylene-based polymer component.

In embodiments herein, the first polyethylene composition can be made by a variety of methods. For example, it may be made by blending or mixing the first molecular weight ethylene-based polymer component and the second molecular weight ethylene-based polymer component together. Alternatively, the first polyethylene composition may be made in a single reactor or a multiple reactor configuration, where the multiple reactors may be arranged in series or parallel, and where each polymerization takes place in solution, in slurry, or in the gas phase. In some embodiments, a dual reactor configuration is used where the polymer made in the first reactor can be either the first molecular weight ethylene-based polymer component or the second molecular weight ethylene-based polymer component. The polymer made in the second reactor may have a density and melt flow rate such that the overall density and melt flow rate of the first polyethylene composition are met. In some embodiments, the first molecular weight ethylene-based polymer component is made in the first reactor, and the second molecular weight ethylene-based polymer component is made in the second reactor. Similar polymerization processes are described in, for example, WO 2004/101674A, which is incorporated herein by reference.

In some embodiments, the first polyethylene composition is manufactured using at least one Ziegler-Natta catalyst system, either alone, or in combination with a single site catalyst. In other embodiments, the first polyethylene composition is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. Sequential polymerization may be conducted such that fresh catalyst is injected into one reactor, and substantially little active catalyst is carried over from the first reactor into the second reactor.

The first polyethylene composition may further comprise one or more antioxidants selected from Formulas 1-5 below.

Formula 1 is shown below.

(Formula 1)

In Formula 1, R1 and R2 are each independently selected from a C1-C20 alkyl group; X is selected from Cl, Br, I, F, OH, $NH_2$, NHR' or NR'R", where R' and R" are each independently a C1-C6 alkyl; n is from 1 to 10; and m is from 10 to 30.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl. In one embodiment, in Formula 1, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl. In one embodiment, in Formula 1, R1 and R2 are each independently selected from n-butyl, sec-butyl, iso-butyl, tert-butyl. In a further embodiment, R1 and R2 are each tert-butyl. In one embodiment, in Formula 1, R1 and R2 are the same alkyl substituent.

In one embodiment, in Formula 1, X is selected from Cl, Br or OH. In a further embodiment, X is selected from Cl or OH. In a further embodiment, X is OH. In one embodiment, in Formula 1, n is from 1-5. In a further embodiment, n is from 1 to 2. In a further embodiment, n is 2. In one embodiment, in Formula 1, m is from 15-20. In a further embodiment, m is 18. In one embodiment, Formula 1 is octadecyl-3-(3,5-di-tert-butyl-4-hydroxyphenyl)-propionate (CAS 002082-79-3), available as IRGANOX™ 1076. A structure of Formula 1 may comprise a combination of two or more of the above embodiments.

Formula 2 is shown below.

(Formula 2)

In Formula 2, R1, R2 and R3 are each independently selected from a C1-C20 alkyl group; R4, R5, R6, R7, R8 and R9 are each independently selected from a C1-C20 alkyl group; X1, X2 and X3 are each independently selected from Cl, Br, I, F, OH, $NH_2$, NHR' or NR'R", where R' and R" are each independently a C1-C6 alkyl; n is from 1 to 6; m is from 1 to 6; and o is from 1 to 6.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl. In one embodiment, in Formula 2, R1, R2 and R3 are each independently a C1-C10 alkyl, a C1-C5 alkyl, a C1-C3 alkyl, a C1-C3 alkyl, or a C1-C2 alkyl. In a further embodiment, R1, R2 and R3 are each independently a C1 alkyl. In one embodiment, in Formula 2, R1, R2 and R3 are each independently selected from methyl or ethyl. In a further embodiment, R1, R2 and R3 are each methyl. In one embodiment, in Formula 2, R1, R2 and R3 are the same alkyl substituent. In one embodiment, in Formula 2, R4, R5, R6, R7, R8 and R9 are each independently selected from a C1-C10 alkyl, a C1-C6 alkyl, a C1-C4 alkyl, a C2-C4 alkyl, or a C3-C4 alkyl. In a further embodiment, R4, R5, R6, R7, R8 and R9 are each independently a C4 alkyl. In one embodiment, in Formula 2, R4, R5, R6, R7, R8 and R9 are each independently selected from n-butyl, sec-butyl, iso-butyl, tert-butyl. In a further embodiment, R4, R5, R6, R7, R8 and R9 are each tert-butyl. In one embodiment, in Formula 2, R4, R5, R6, R7, R8 and R9 are the same alkyl substituent.

In one embodiment, in Formula 2, X1, X2 and X3 are each independently selected from Cl, Br or OH. In a further embodiment, X1, X2 and X3 are each independently selected from Cl or OH. In a further embodiment, X1, X2 and X3 are each OH. In one embodiment, in Formula 2, X1, X2 and X3 are the same substituent.

In one embodiment, in Formula 2, n is from 1-4. In a further embodiment, n is from 1 to 2. In a further embodiment, n is 1. In one embodiment, in Formula 2, m is from 1-4. In a further embodiment, m is from 1 to 2. In a further embodiment, m is 1. In one embodiment, in Formula 2, o is from 1-4. In a further embodiment, o is from 1 to 2. In a further embodiment, o is 1. In one embodiment, in Formula 2, m=n=o. In one embodiment, Formula 2 is 1,3,5-trimethyl-2,4,6-tris(3,5-di-t-butyl-4-hydroxybenzyl)benzene (available as IRGANOX™ 1330). A structure of Formula 2 may comprise a combination of two or more of the above embodiments.

Formula 3 is shown below.

(Formula 3)

In Formula 3, R1 and R2 are each independently selected from a C1-C20 alkyl group; X is selected from Cl, Br, I, F, OH, $NH_2$, NHR' or NR'R", where R' and R" are each independently a C1-C6 alkyl; n is from 1 to 10; and m is from 1 to 10.

Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl. In one embodiment, in Formula 3, R1 and R2 are each independently a C1-C10 alkyl, a C1-C6 alkyl, a C1-C4 alkyl, a C2-C4 alkyl, OR a C3-C4 alkyl. In a further embodiment, R1 and R2 are each independently a C4 alkyl. In one embodiment, in Formula 3, R1 and R2 are each independently selected from n-butyl, sec-butyl, iso-butyl, tert-butyl. In a further embodiment, R1 and R2 are each tert-butyl. In one embodiment, in Formula 3, R1 and R2 are the same alkyl substituent.

In one embodiment, in Formula 3, X is selected from Cl, Br or OH. In a further embodiment, X is selected from Cl or OH. In a further embodiment, X is OH. In one embodiment, in Formula 3, n is from 1-6. In a further embodiment, n is from 1 to 4. In a further embodiment, n is from 1 to 2. In a further embodiment, n is 1. In one embodiment, in Formula 3, m is from 1-6. In a further embodiment, m is from 1 to 4. In a further embodiment, m is from 1 to 2. In a further embodiment, m is 2. In one embodiment, Formula 3 is (Pentaerythritol Tetrakis(3-(3,5-di-tert-butyl-4-hydroxyphenyl)propionate) (CAS 6683-19-8) available as IRGANOX™ 1010. A structure of Formula 3 may comprise a combination of two or more of the above embodiments.

Formula 4 is shown below.

(Formula 4)

In Formula 4, R1 and R2 are each independently selected from a C1-C20 alkyl group. Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl. In one embodiment, in Formula 4, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl. In one embodiment, in Formula 4, R1 and R2 are each independently selected from n-butyl, sec-butyl, iso-butyl, tert-butyl. In a further embodiment, R1 and R2 are each tert-butyl. In one embodiment, in Formula 4, R1 and R2 are the same alkyl substituent. In one embodiment, Formula 4 is tris-(2,4-di-tert-butylphenyl)phosphate (CAS 31570-04-4) available as IRGAFOS™ 168. A structure of Formula 4 may comprise a combination of two or more of the above embodiments.

Formula 5 is shown below.

(Formula 5)

In Formula 5, R1 and R2 are each independently selected from a C1-C20 alkyl group; Z is selected from Cl, Br, I, F, OH, $NH_2$, NHR' or NR'R", where R' and R" are each independently a C1-C6 alkyl; and n is from 1 to 10. Examples of C1-C20 alkyls include, but are not limited to, methyl, ethyl, n-propyl, iso-propyl, n-butyl, sec-butyl, iso-butyl, tert-butyl, n-pentyl, neopentyl, n-hexyl, and cyclohexyl. In one embodiment, in Formula 5, R1 and R2 are each independently a C1-C10 alkyl, a C1-C6 alkyl, a C1-C4 alkyl, a C2-C4 alkyl, or a C3-C4 alkyl. In a further embodiment, R1 and R2 are each independently a C4 alkyl. In one embodiment, in Formula 5, R1 and R2 are each independently selected from n-butyl, sec-butyl, iso-butyl, tert-butyl. In a further embodiment, R1 and R2 are each tert-butyl. In one embodiment, in Formula 5, R1 and R2 are the same alkyl substituent.

In one embodiment, in Formula 5, Z is selected from Cl, Br or OH. In a further embodiment, Z is selected from Cl or OH. In a further embodiment, Z is OH. In one embodiment, in Formula 5, n is from 1-5. In a further embodiment, n is from 1 to 2. In a further embodiment, n is 2. In one embodiment, Formula 5 is IRGANOX MD-1024. 2',3-bis[[3-[3,5-di-tert-butyl-4-hydroxyphenyl]propionyl]]propionohydrazide. (CAS 32687-78-8) available as IRGANOX MD™ 1024. A structure of Formula 5 may comprise a combination of two or more of the above embodiments.

Additional antioxidants include 1,3,5-tris(3,5-di-tert-butyl-4-hydroxybenzyl)-1,3,5-triazine-2,4,6(1H,3H,5H)-trione (CAS 2767-62-6) available as IRGANOX 3114; 1,3,5-TRIS(4-tert-butyl-3-hydroxy-2,6-dimethyl benzyl)-1,3,5-triazine-2,4,6-(1H,3H,5H)-trione (CAS 040601-76) available as CYANOX 1790 (CyTech Industries); Ethylenebis(oxyethylene)bis-(3-(5-tert-butyl-4-hydroxy-m-tolyl)-propionate) (CAS 36443-68-2) available as IRGANOX 245; 1,6-hexamethylene bis (3,5-di(tert)-butyl-4-hydroxyhydrocinnamate (CAS 35074-77-2) available as IRGANOX 259; thiodiethylene bis[3-(3,5-di-tert-butyl-4-hydroxyphenyl) propionate] (CAS 41484-35-9) available as IRGANOX 1035; DOVERFOS 9228; 2,2'-oxalyldiamidobis[ethyl 3-(3, 5-di-t-butyl-4-hydroxyphenyl) propionate] (available as Naugard™ XL1); and mixtures thereof. Processing aids, UV stabilizers, other antioxidants, pigments or colorants, can also be advantageously used with the compositions of the present invention.

In embodiments herein, the one or more of the antioxidants selected from Formulas 1-5 may be present in an amount greater than or equal to 500 ppm, based on the total weight of the first polyethylene composition. In one or more embodiments, the compound selected from Formula 1 is present in an amount from 500 to 2500 ppm, based on the total weight of the first polyethylene composition. In addition to the amount of the compound selected from Formula 1, in one or more further embodiments, the compound selected from Formula 2 is present in an amount from 1000 to 3000 ppm, based on the total weight of the first polyethylene composition. In addition to the amount of the compound selected from Formulas 1 and/or 2, in one or more further embodiments, the compound selected from Formula 3 is present in an amount from 500 to 2500 ppm, based on the total weight of the first polyethylene composition. In addition to the amount of the compound selected from Formulas 1, 2, and/or 3, in one or more further embodiments, the compound selected from Formula 4 is present in an amount from 500 to 1500 ppm, based on the total weight of the first polyethylene composition. In one or more further embodiments, the compound selected from Formula 5 is present in an amount from 500 to 1500 ppm, based on the total weight of the first polyethylene composition.

In one or more embodiments herein, the weight ratio of the compound selected from Formula 2 to the compound selected from Formula 1 (Compound selected from Formula 2/Compound selected from Formula 1) is greater than 1 or in the alternative from 1 to 6. In addition to the foregoing weight ratio, in one or more further embodiments, the weight ratio of compound selected from Formula 3 to the compound selected from Formula 1 (Compound selected from Formula 3/Compound selected from Formula 1) is from 0.5 to 2.5. In addition to the foregoing weight ratios, in one or more further embodiments, the weight ratio of compound selected from Formula 4 to the compound selected from Formula 1 (Compound selected from Formula 4/Compound selected from Formula 1) is from 0.5 to 2.

Second Polyethylene Composition

The second polyethylene composition comprises from 1 wt. % to 99 wt. %, based on the total weight of the second polyethylene composition, of a high density polyethylene having a density greater than 0.940 g/cc, and from 1 wt. % to 99 wt. %, based on the total weight of the second polyethylene composition, of a maleic anhydride-grafted polyethylene. All individual values and subranges of from 1 wt. % to 99 wt. % of a high density polyethylene and from 1 wt. % to 99 wt. % of a maleic anhydride-grafted polyethylene are included and disclosed herein. For example, in some embodiments, the second polyethylene composition comprises from 50 wt. % to 99 wt. %, from 60 wt. % to 99 wt. %, from 70 wt. % to 99 wt. %, or from 70 wt. % to 95 wt. %, based on the total weight of the second polyethylene composition, of the high density polyethylene, and from 1 wt. % to 50 wt. %, from 1 wt. % to 40 wt. %, from 1 wt. % to 30 wt. %, or from 5 wt. % to 30 wt. %, based on the total weight of the second polyethylene composition, of a maleic anhydride-grafted polyethylene. In other embodiments, the second polyethylene composition comprises from 70 wt. % to 95 wt. %, based on the total weight of the second polyethylene composition, of the high density polyethylene, and from 5 wt. % to 30 wt. %, based on the total weight of the second polyethylene composition, of a maleic anhydride-grafted polyethylene.

The maleic anhydride grafted polyethylene (MAH-g-PE) may be a maleic anhydride grafted high density polyethylene (MAH-g-HDPE), a maleic anhydride grafted medium density polyethylene (MAH-g-MDPE), a maleic anhydride grafted linear low density polyethylene (MAH-g-LLDPE), or a maleic anhydride grafted polyolefin elastomer. In some embodiments, the grafted polyethylene in the MAH-g-PE is a high density polyethylene (HDPE).

In some embodiments, the amount of maleic anhydride constituent grafted onto the polyethylene chain is greater than 0.05 wt. % to 3 wt. % (based on the weight of the polyethylene), as determined by titration analysis, FTIR analysis, or any other appropriate method. All individual values and subranges of greater than 0.05 wt. % to 3 wt. % are included and disclosed herein. For example, the amount of maleic anhydride constituent grafted onto the polyethylene chain may be from 0.1 wt. % to 2.7 wt. %, 0.1 wt. % to 2.0 wt. %, or 0.1 wt. % to 2.0 wt. %, based on the weight of the polyethylene.

In some embodiments, the MAH-g-PE has a melt index (I2) of 0.01 g/10 minutes to 10 g/10 minutes. All individual values and subranges between 0.01 g/10 minutes and 15 g/10 minutes are included herein and disclosed herein. For example, the MAH-g-PE can have a melt index (I2) of 0.2 g/10 minutes to 5 g/10 minutes, 0.5 g/10 minutes to 3 g/10 minutes, or 1 g/10 minutes to 2 g/10 minutes.

The graft process for MAH-g-PE can be initiated by decomposing initiators to form free radicals, including azo-containing compounds, carboxylic peroxyacids and per-oxyesters, alkyl hydroperoxides, and dialkyl and diacyl peroxides, among others. Many of these compounds and their properties have been described (Reference: J. Brand-erup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed in U.S. Pat. No. 7,897,689, in the table spanning Col. 48 line 13-Col. 49 line 29, which is hereby incorporated by reference. Alternatively, the grafting process for MAH-g-PE can be initiated by free radicals generated by thermal oxidative process.

Examples of second polyethylene compositions that may be used in the tie layer include those available from The Dow Chemical Company under the trade name AMPLIFY™ such as AMPLIFY™ TY 1056H, AMPLIFY™ TY 1053H, and others.

The second polyethylene compositions described herein may further contain one or more additives. Additives include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

The compositions described herein may be characterized by exceptional resistance to slow crack growth as measured by the PENT test. In embodiments herein, the composition may have a PENT lifetime of greater than, or equal to, 100 hours, greater than, or equal to, 500 hours, or greater than, or equal to, 1000 hours, at 2.4 MPa and 80° C. using ASTM F1473-11. All individual values and subranges of greater than, or equal to, 500 hours are included and disclosed herein. For example, in some embodiments, the compositions have a PENT lifetime of greater than, or equal to 3,000 hours, at 2.4 MPa and 80° C. using ASTM F1473-11.

The compositions described herein may be manufactured by blending the first polyethylene composition with the second polyethylene composition. Preparation of the blend and second blend can be accomplished by any suitable mixing means known in the art, including melt or dry/physical blending of the individual components. It should be understood that other suitable methods for blending the first polyethylene composition and the second polyethylene composition together may be utilized.

The tie layer compositions described herein can be used to manufacture a shaped article, or one or more components of a shaped article. Such articles may be single-layer or multi-layer articles, which may be obtained by suitable known conversion techniques, applying heat, pressure, or a combination thereof, to obtain the desired article. Examples of suitable conversion techniques may include, for example, blow-molding, co-extrusion blow-molding, injection molding, injection stretch blow molding, compression molding, extrusion, pultrusion, calendering and thermoforming. Shaped articles may include, for example, pipes, pipe coatings (for example, steel pipe coatings), blow molded articles, injection molded articles, compression molded articles, drip tapes and tubing, geomembranes, films, sheets, fibers, profiles and moldings.

In some embodiments, the tie layer compositions described herein may be particularly well-suited for use in manufacturing a multilayer pipe. The multilayer pipe, for example, may comprise a first layer, a second layer, and a third layer, wherein the second layer is positioned between the first layer and third layer, and wherein the second layer is formed from the tie layer compositions described herein. In further embodiments, the first layer is formed from a polyethylene composition. In even further embodiments, the third layer is formed from a fiberglass laminate or composite, a polyethylene tape, polyester, or aramid fiber. In even further embodiments, the third layer is formed from a fiberglass laminate or composite. Without being bound by theory, it is believed that the tie layer compositions described herein can maintain good bonding between the first layer and third layer at temperatures of up to 180° F. In some embodiments, the multilayer pipe may comprises a fourth layer, wherein the third layer is positioned between the second layer and the fourth layer. The fourth layer may be formed from a polyethylene composition or other suitable polymer composition for pipe applications.

The embodiments described herein may be further illustrated by the following non-limiting examples.

EXAMPLES

Unless otherwise stated, the following test methods are used. All test methods are current as of the filing date of this disclosure.

Density

Density is determined according to ASTM D792, and reported in grams per cubic centimeter (or g/cc).

Melt Index

Melt index, or I2, for ethylene-based polymers is determined according to ASTM D1238 at 190° C., 2.16 kg, and reported in grams per ten minutes (or g/10 min). High load melt index, or I21, for ethylene-based polymers is determined according to ASTM D1238 at 190° C., 21.6 kg, and reported in grams per ten minutes (or g/10 min).

Gel Permeation Chromatography (GPC)

The chromatographic system consisted of a PolymerChar GPC-IR (Valencia, Spain) high temperature GPC chromatograph equipped with a 4-capillary differential viscometer detector and a IR5 multi-fixed wavelength infra-red detector. A Precision Detectors (Agilent) 2-angle laser light scattering detector Model 2040 was added to the system. The 15-degree angle of the light scattering detector was used for calculation purposes. Data collection was performed using "GPC One" software from PolymerChar. The system was equipped with an on-line solvent degas device from Agilent.

Both the carousel compartment and the column compartment were operated at 150° C. The columns used were 4 Agilent "Mixed A" 30 cm 20-micron columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

For conventional molecular weight measurements, the GPC column set was calibrated with at least 20 narrow molecular weight distribution polystyrene standards (Agilent) with molecular weights ranging from 580 to 8,400,000 and were arranged in 6 "cocktail" mixtures with at least a decade of separation between individual molecular weight components. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using the following equation (as described in Williams and Ward, *J. Polym. Sci., Polym. Let.*, 6, 621 (1968)).:

$$M_{polyethylene} = A \times (M_{polystyrene})^B$$

where M is the molecular weight, A has a value of approximately 0.41 for conventional GPC and triple detector backbone MW calculations (referencing an A value that yields an Mw of 52,000 for SRM NBS1475) and B is equal to 1.0. A third-order polynomial was used to fit the respective polyethylene-equivalent calibration points. Data calculations were performed using "GPC One" software from PolymerChar.

Peel Strength

Figure 1:
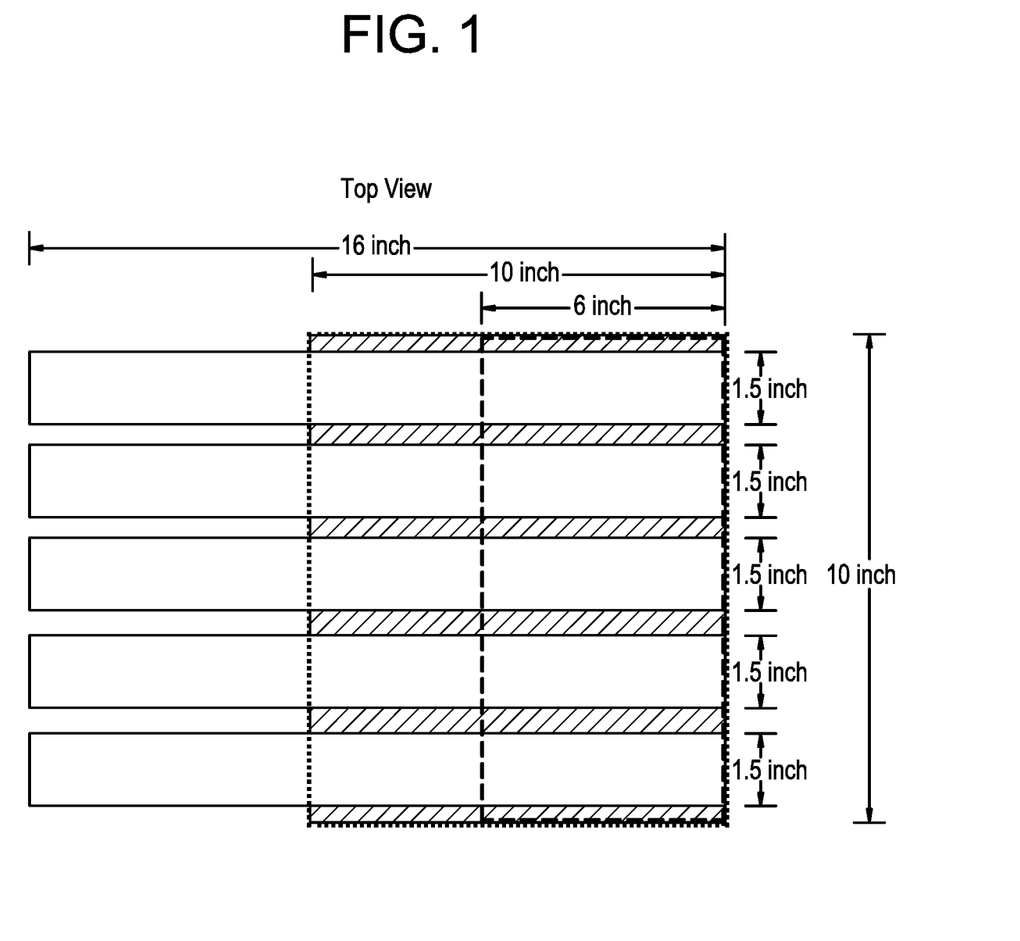
FIG. 1 pictorially depicts test specimen preparation for the peel test as disclosed herein.

Test specimens comprising a 3-layered structure, as shown in FIG. 1, are prepared, wherein the first layer is a compression molded HDPE strip with a dimension 1.5" W×10" L×0.5" thick, the third layer is a fiberglass tape with a dimension 1.5" W×16" L×40 mils thick, and the second layer is a tie layer which is "sandwiched" in between the first and third layer and bonds the first and third layers together.

Figure 2:
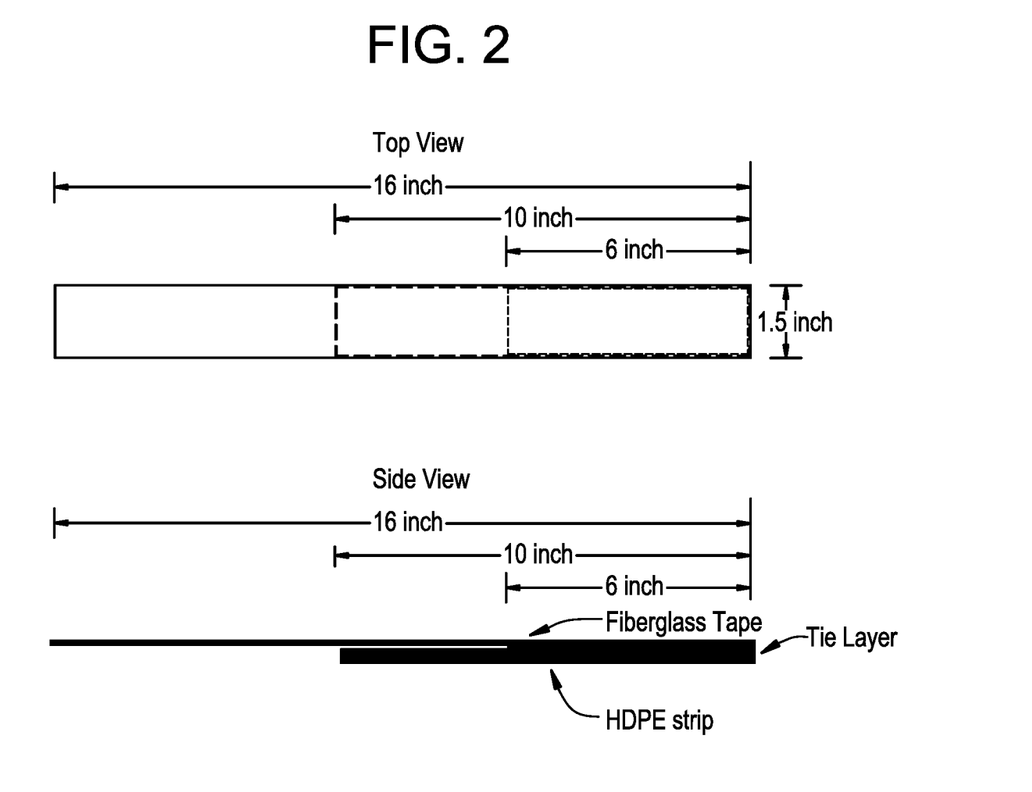
FIG. 2 pictorially depicts a top and side view of an individual test specimen for the peel test as disclosed herein.

A compression molded HDPE plaque is first prepared in a 10" W×10" L×0.5" thick steel chassis. Once the plaque is made and cooled to room temperature, and while leaving the plaque in the chassis, carefully align a tie layer sheet (6" W×10" L×40 mils thick) with one side of the HDPE plaque and place 5 equally spaced fiberglass tapes (1.5" W×16" L×55 mils thick) on top of the tie layer sheet with one end of each tape aligned with the same side of the HDPE plaque with which the tie layer sheet is also aligned. (see FIG. 1) Place a steel plate on top of the fiberglass tapes to hold them in position, then put the whole assembly onto the press and gently heat to 300° F. while holding at a pressure at 50 psi for 30 minutes. After cooling to room temperature, remove the plaque out of the chassis, carefully cut the five individual test specimens out with a band saw. Properly prepared test specimens is shown in FIG. 2, wherein the fiberglass tape is bonded for the full width with the HDPE strip underneath for 6 inches in length from one end of the HDPE strip. The remaining 4 inches of the HDPE strip is not bonded with the fiberglass tape so that it can be easily gripped & pulled for the peel test. A test apparatus used similar to ISO 8510-2-2006 "*Adhesive Peel Test for a Flexible-Bonded-to Rigid Test Specimen Assembly*" is shown in FIG. 3.

Figure 3:
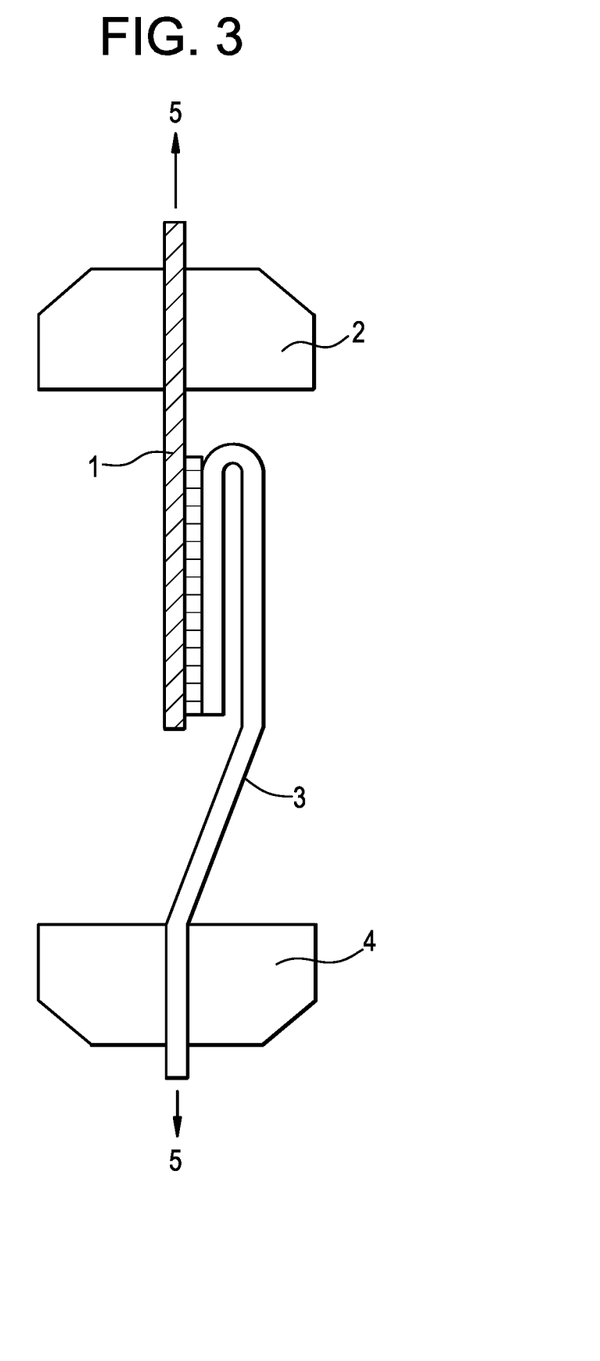
FIG. 3 pictorially depicts the installation of the test specimen for the peel test as disclosed herein.

The test specimen is installed in a tensile test apparatus as shown in FIG. 3 with the unbonded end of the HDPE strip (1) in the top grip (2) and fiberglass tape (3) in the bottom grip (4). The direction of pull (5) is shown. The force required to peel the fiberglass tape off the HDPE strip is recorded.

TABLE 1

MAH Grafted Materials

| | Description | MAH Graft Level Range | Melt Index (ASTM D1238, 190° C., 2.16 kg) |
|---|---|---|---|
| ADMER™ NF468A, available from Mitsui Chemicals, Inc. | maleic anhydride grafted polyethylene | greater than 0.1 wt. % to 0.5 wt. % (based on the weight of the polyethylene) | 4.0 |
| AMPLIFY™ TY1451B, available from The Dow Chemical Company. | maleic anhydride grafted polyethylene | greater than 0.1 wt. % to 0.5 wt. % (based on the weight of the polyethylene) | 1.8 |

Composition 1

The tie layer composition ("Composition 1") was made by compounding about 80 wt. % of a first polyethylene composition with about 20 wt. % of a second polyethylene composition. The first polyethylene composition has a first molecular weight ethylene-based polymer component and a second molecular weight ethylene-based polymer component, the first polyethylene composition having a density of 0.950 g/cc, a melt index (I2) of 0.10 g/10 min, a high load melt index (I21) of 7.0 g/10 min, and a molecular weight distribution (MWD) of 30 (available as INTREPID™ 2499 NT from The Dow Chemical Company). The first polyethylene composition further comprises 500-2500 ppm of IRGANOX™ 1076, 500-1500 ppm of IRGAFOS™ 168, 500 to 2500 ppm of IRGANOX™ 1010, 500 to 1500 ppm of IRGANOX™ 1024 and 1000 to 3000 ppm of IRGANOX™ 1330. The weight ratio of IRGANOX™ 1330/IRGANOX™ 1076 is greater than 1. The weight ratio of IRGANOX™ 1010/IRGANOX™ 1076 is from 0.5 to 2.5. The weight ratio of IRGAFOS™ 168/IRGANOX™ 1076 is from 0.5 to 2. The second polyethylene composition comprising (i) 98.5 wt. %, based on the total weight of the second composition, of a high density polyethylene having a density of 0.960 g/cc and (ii) 1.5 wt. %, based on the total weight of the second composition, of a maleic-anhydride grafted polyethylene that has a graft level of greater than 0.6 wt. % to 3.0 wt. % (based on the weight of the polyethylene) and a melt index (I2) of 2.0, as measured according to ASTM D1238 (190° C., 2.16 kg).

Composition 1 was then compression molded into a 6" W×10" L×40 mils thick sheet, which was used to prepare test specimens (see FIG. 1) following the procedure described in the Peel Strength test method. The test specimen was tested for peel strength using a tensile apparatus shown in FIG. 3. The results are shown below in Table 2. As shown below, Composition 1 exhibits a much higher average peel strength as compared to the two comparative resins at both lower and higher temperatures.

TABLE 2

Peel Strength Testing

| Tie Layer Material | Test Temperature (° F.) | Average Peel Strength (lb/in) |
|---|---|---|
| ADMER™ NF468A | 80 | 18 |
| | 180 | 6 |
| AMPLIFY™ TY1451B | 80 | 16 |
| | 180 | 6 |
| Composition 1 | 80 | >50 |
| | 180 | >50 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A tie layer composition comprising:
   from 60 wt. to 95 wt. % of a first polyethylene composition comprising a first molecular weight ethylene-based polymer component and a second molecular weight ethylene-based polymer component, wherein the first polyethylene composition has a density from 0.940 to 0.960 g/cc, a melt index (I2) from 0.01 to 5 g/10 min, and a molecular weight distribution from 10 to 40, as determined by conventional gel permeation chromatography; and
   from 5 wt. % to 40 wt. % of a second polyethylene composition comprising:
   (i) from 1 to 99 wt. %, based on the total weight of the composition, of a high density polyethylene having a density greater than or equal to 0.940 g/cc; and
   (ii) from 1 to 99 wt. %, based on the total weight of the composition, of a maleic-anhydride grafted polyethylene.

2. The tie layer composition of claim 1, wherein the first polyethylene composition has a high load melt index (I21) from 1 to 20 g/10 min.

3. The tie layer composition of claim 1, wherein the first polyethylene composition further comprises:
a) a compound selected from Formula 1:

(Formula 1)

wherein R1 and R2 are each independently selected from a C1-C20 alkyl group,
X is selected from Cl, Br, I, F, OH, $NH_2$, NHR' or NR'R", where R' and R" are each independently a C1-C6 alkyl,
n is from 1 to 10, and
m is from 10 to 30,
and wherein the compound selected from Formula 1 is present in an amount greater than, or equal to, 500 ppm, based on the total weight of the first polyethylene composition; and
b) a compound selected from Formula 2:

(Formula 2)

wherein R1, R2 and R3 are each independently selected from a C1-C20 alkyl group;
R4, R5, R6, R7, R8 and R9 are each independently selected from a C1-C20 alkyl group,
X1, X2 and X3 are each independently selected from Cl, Br, I, F, OH, $NH_2$, NHR' or NR'R", where R' and R" are each independently a C1-C6 alkyl,
n is from 1 to 6,
m is from 1 to 6, and
o is from 1 to 6; and
wherein the weight ratio of the compound selected from Formula 2 to the compound selected from Formula 1 (Compound Selected From Formula 2/Compound Selected From Formula 1) is greater than 1.

4. The tie layer composition of claim 1, wherein the first polyethylene composition further comprises a compound selected from Formula 3:

(Formula 3)

wherein R1 and R2 are each independently selected from a C1-C20 alkyl group,
X is selected from Cl, Br, I, F, OH, $NH_2$, NHR' or NR'R", where R' and R" are each independently a C1-C6 alkyl,
n is from 1 to 10, and
m is from 1 to 10.

5. The tie layer composition of claim 4, wherein the compound selected from Formula 3 is present in an amount from 500 to 2500 ppm, based on the weight of the first polyethylene composition.

6. The tie layer composition of claim 1, wherein the first polyethylene composition further comprises a compound selected from Formula 4:

(Formula 4)

wherein R1 and R2 are each independently selected from a C1-C20 alkyl group.

7. The tie layer composition of claim 6, wherein the compound selected from Formula 4 is present in an amount from 500 to 1500 ppm, based on the weight of the first polyethylene composition.

8. The tie layer composition of claim 1, wherein the second polyethylene composition comprises 70 to 95 weight percent of the high density polyethylene and 5 to 30 weight percent of the maleic anhydride grafted polyethylene.

9. The tie layer composition of claim 1, wherein the amount of maleic anhydride grafted onto the polyethylene chain of the maleic anhydride grafted polyethylene is greater than 0.05 weight percent to 3 weight percent, based on the weight of the maleic anhydride grafted polyethylene.

10. A multilayer pipe comprising a first layer, a second layer, and a third layer, wherein the second layer is positioned between the first layer and third layer, and wherein the second layer is formed from the tie layer composition of claim 1.

11. The multilayer pipe of claim 10, wherein the first layer is formed from a polyethylene composition and the third layer is formed from a fiberglass laminate or composite.

* * * * *